United States Patent
Blaukopf et al.

(10) Patent No.: US 7,610,561 B2
(45) Date of Patent: Oct. 27, 2009

(54) FINE-GRAINED CONTROL OF Z-ORDER ELEMENTS IN A PRESENTATION

(75) Inventors: Jacob Benjamin Blaukopf, Cambridge (GB); Nicholas Carl Brook, Cambridge (GB); Stefan Geoffrey Butlin, Cambridge (GB)

(73) Assignee: QUALCOMM Incorporated, San Diego, IL (US)

( * ) Notice: Subject to any disclaimer, the term of this patent is extended or adjusted under 35 U.S.C. 154(b) by 360 days.

(21) Appl. No.: 11/421,375

(22) Filed: May 31, 2006

(65) Prior Publication Data

US 2006/0271871 A1    Nov. 30, 2006

Related U.S. Application Data

(60) Provisional application No. 60/686,349, filed on May 31, 2005.

(51) Int. Cl.
*G06F 13/00* (2006.01)
*G06F 15/00* (2006.01)
(52) U.S. Cl. .................. 715/794; 455/566
(58) Field of Classification Search ............ 715/700, 715/764, 766, 853, 716, 748, 794; 345/619, 345/473, 629, 748; 455/566, 556.1
See application file for complete search history.

(56) References Cited

U.S. PATENT DOCUMENTS

2002/0070951 A1* 6/2002 Wilkinson et al. .......... 345/629
2004/0021679 A1* 2/2004 Chapman et al. ............ 345/700
2004/0046789 A1* 3/2004 Inanoria ...................... 345/748
2005/0125741 A1* 6/2005 Clow et al. .................. 715/794

FOREIGN PATENT DOCUMENTS

GB    2 411 331    8/2005

OTHER PUBLICATIONS

Ola Andersson et al: "Scalable Vector Graphics (SVG) 1.2. W3C Working Draft, Oct. 27, 2004" W3C Working Draft, [Online] Oct. 27, 2004, pp. 1-47, XP002405454 Editor: Dean Jackson, W3C Retrieved from the Internet: URL:http://www.w3.org/TR/2004/WD-SVG12-200410271/> [retrieved on Oct. 5, 2007] abstract paragraphs [0008], [0010], [10.1.3], [10.2.3], [11.16], [16.4].

(Continued)

*Primary Examiner*—Kevin Nguyen
(74) *Attorney, Agent, or Firm*—Robert J. O'Connell; Nicholas A. Cole

(57) ABSTRACT

Described are various methods and apparatuses for fine grained control of z-order elements in a presentation. A structure is defined containing user interface elements and an order is defined for rendering such user interface elements. It is desired that some elements may need to be rendered out of the defined order, therefore a raise user interface element is defined allowing for one or more user interface elements to be defined to be rendered out of the normally defined order. User interface elements may something to be presented on a display and may also include program code for defining behaviors.

16 Claims, 8 Drawing Sheets

OTHER PUBLICATIONS

Jeff Ayars et al: "Synchronized Multimedia Integration Language (SMIL 2.0)—[Second Edition]" W3C Recommendation, [Online] Jan. 7, 2005, pp. 1-34, XP002405606 Retrieved from the Internet: URL:http://www.w3.org/ATR/2005/REC-SMIL2-20050107/> [retrieved on Oct. 18, 2006] paragraphs [05.2]— [05.3], [05.8], [05.9], [5.9.1]—[5.9.3], [5.10.1], [5.10.2].

Julius C. Mong, David F. Brailsford: "Using SVGA as the rendering model for structured and graphically complex web material" Proceedings of the 2003 ACM Symposium on Document Engineering, Doceng '03, Grenoble, France, Nov. 20, 2003, pp. 88-91, XP002404713 ACM Press New York, NY, USA abstract paragraphs [0002], [0003], [03.1].

* cited by examiner

FINE-GRAINED CONTROL OF Z-ORDER ELEMENTS IN A PRESENTATION

CROSS REFERENCE TO RELATED APPLICATION

This application claims benefit of U.S. Provisional Application Ser. No. 60/686,349, filed on May 31, 2005, the entirety of which is hereby incorporated herein by this reference.

BACKGROUND OF THE INVENTION

1. Field of the Invention

The present invention generally relates to variable processing of user interfaces. More particularly, the invention relates to controlling the rendering of user interface elements.

2. Description of the Related Art

In a data language, including hierarchical data languages and markup languages, including XML-based languages, User Interface (UI) elements presented on a display are given an order for layout. (note: a UI element is something that may be presented on the screen. A code element, for example, may be a line of code or a tag in an XML based language. A UI element may be characterized by one or more code elements. Further, the code element may not describe a presentation, i.e., it may describe a behavior)

The layout order is typically defined by how the code elements associated with the UI element are declared in the language. When painting (or rendering) these UI elements to the display, the order of painting follow the layout order.

On a display, the horizontal and vertical, length and width, etc. are typically referred to in "x-y" coordinates identifying their representation in an x-y plane. When presenting a UI element in a presentation, their "z-order" refers to the order in which they are place on with respect to each other. While all UI elements are typically viewed in the x-y plane, the z-order of presentation is of concern because UI elements rendered on top of another may (unless they have some transparency) cover UI elements rendered below it.

Using XML as an example, a user interface (UI) specified in XML has an implicit paint order for UI elements identical to the order in which they are declared in the code. A complex UI requires the ability to allow visual UI elements to be drawn on top of other UI elements (declared later in the XML sequence). Therefore, there is a need to able to change the z-order of rendering.

Current UI data language schemes do not address this problem or offer inefficient solutions to the problem. Specifically, Scalar Vector Graphics (SVG) version 2 has proposed addressing z-order control. The mechanism to provide this control has not been established, or defined. Some indications show that they may use an index. Use of an index for z-control does suffer from clipping which is undesirable in a UI.

Another solution included creating several versions of pages containing the UI elements to be presented, each page varying the z-order of the associated code elements. However, this solution involves additional resources by requiring the development of additional pages, storing of pages and maintaining changes to the code across multiple pages and is a brute force, i.e. inefficient, way of dealing with the dynamic control of the z-order.

SUMMARY OF THE INVENTION

Systems and methods consistent with the present invention overcome the shortcomings of existing systems by creating systems, methods and apparatuses that control the rendering and presentation of user interface elements.

In one embodiment of the present invention, a method for controlling the z-order of a first element rendered in a presentation comprises receiving an ordered list of elements representing the order of layout in a presentation, assigning the first element in the ordered list to a raisecontainer element, wherein the first element may be one of several elements in the ordered list, painting the presentation the ordered list elements except for the first element, and painting the raisecontainer, containing the first element to the presentation.

In another embodiment of the present invention, a method for rendering a plurality of user interface elements, defining a raise user interface element, rendering on the display the plurality of user interface elements, and rendering on the display the raise user interface element, wherein the raise user interface element is rendered after the rendering of the plurality of user interface elements. In this method, the raise user interface element is one of the plurality of user interface elements and the step of rendering on the display of the plurality of user interface elements does not render the raise user interface element. The structure containing the plurality of user interface elements may be tree structure. In addition, the raise user interface element may not be clipped when rendered on the display. Also, the raise user interface element may be defined by focusing on a displayed user interface element.

In yet another embodiment, a device for controlling the z-order of a first element rendered in a presentation, comprises a memory for storing program code, wherein the program code contains instructions for an ordered list of elements representing the order of layout in a presentation, and a processor configured to assign the first element in the ordered list to a raisecontainer element, wherein the first element may be one of several elements in the ordered list, to paint the presentation with the ordered list elements except for the first element, and to paint the raisecontainer, containing the first element to the presentation.

In yet another embodiment, a device for rendering a plurality of user interface elements in a display comprises a memory containing program code defining a structure containing the plurality of user interface elements, and a processor configured to define a raise user interface element, render on the display the plurality of user interface elements, and to render on the display the raise user interface element, wherein the raise user interface element is rendered after the rendering of the plurality of user interface elements.

Other objects, advantages and features of the present invention will become apparent after review of the herein after set forth Brief Description of the Drawings, Detailed Description of the Invention and the Claims.

BRIEF DESCRIPTION OF THE DRAWINGS

With reference to the figures in which like numerals represent like elements throughout.

DETAILED DESCRIPTION

Figure 1:
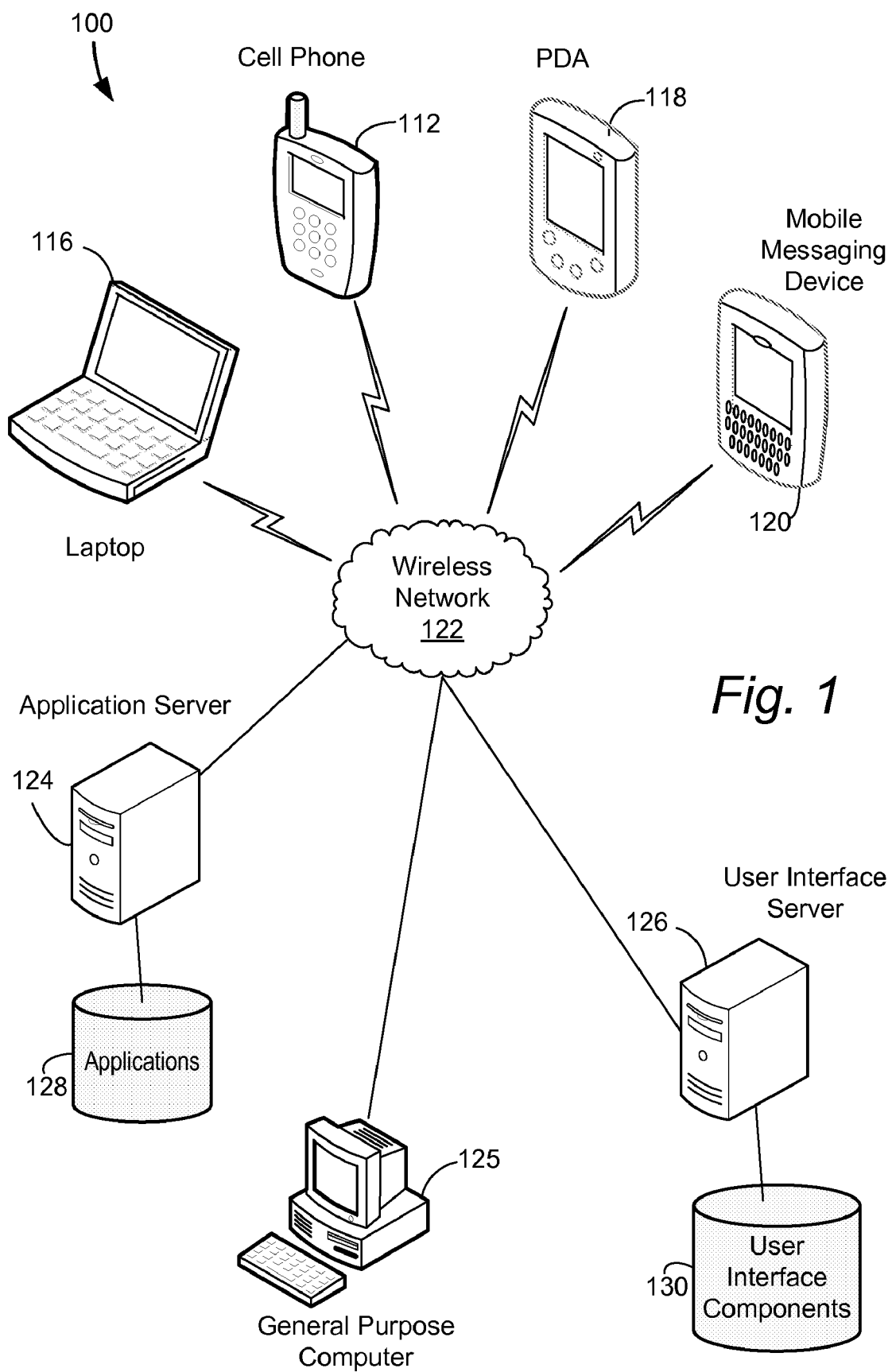
FIG. 1 is a functional diagram of a communications environment in which devices may operate in an embodiment of the present invention.

The present invention addresses the problem in the art by allowing fine-grain control of z-order while maintaining efficiency with respect to clipping and therefore rendering speed. Should technology ever become sophisticated enough to develop a true 3D display (not just 3D representation on a 2 dimensional surface), the present invention would also be applicable to such systems.

Further advantages include a raise user interface element may be clipped to specified constraints, rather than to the dimensions of the screen; an element may be raised, but still explicitly below other elements, which may be declared before or after it in the xml-based parsing sequence; Multiple and/or nested levels of UI may be achieved, and their z-order dynamically altered, by the user of multiple and/or nested raise containers.

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

Regarding use of terms, in this description, the terms "wireless device," "wireless telephone," and "mobile device" are used interchangeably. The term "application" as used herein is intended to encompass executable and nonexecutable software files, raw data, aggregated data, patches, content, user interfaces and user interface components, and other code segments. Further, like numerals refer to like elements throughout the several views, and the articles "a" and "the" includes plural references, unless otherwise specified in the description.

TrigML is a data driven language useful in developing User Interfaces. TrigML is a product owned by QUALCOMM Corporation. Like data languages defined under XML, TrigML code includes the use of tags. While embodiments will be described in context of TrigML for a user interface on a wireless device, it will be recognized that this is for descriptive purposes only and not a limitation on the invention. The apparatus and methods described herein are also applicable in non-user interface environments and, as stated above, in those using environments using a different data language.

FIG. 1 is a functional diagram of a communications environment 100 in which devices may operate in an embodiment of the present invention. In this example, the communications environment 100 includes a wireless network 122. The wireless network 122 may be a communications network operated by a wireless service provider to provide data or telecommunications connectivity to mobile devices. Further, the wireless network 122 may also include wired networks, the Internet, Wide Area Networks, the Public Switch Telephone Network (PSTN) and other public and/or private networks so that devices may communicate to directly or indirectly using other devices connected to these to these networks.

In one example, the wireless network 122 may include a cellular telephone network. Several mobile devices are in communication with the wireless network 122, such as a cellular phone 112, a laptop computer 116, a PDA 118, and a mobile messaging device 120. These devices are only shown as illustrative of the many types of devices that may communicate over the wireless network 122.

Illustrated in FIG. 1 are an application server 124 and a user interface server 126. The user interface server 126 is a computing device that serves user interface components 130 (described in more detail below). These user interface components 130 may be downloaded to other devices connected to the wireless network 122. User interface components include code and/or data to render a user interface (such as function calls, menus, code for content calls, skins, etc.). Note, many other servers may be used connect to the network to deliver information including content servers. The type of information that can be made available is limitless, and very many different examples will be apparent to those skilled in the art. The user interface server 126 includes server software that is configured to provide the user interface components 130 to requesting devices over the wireless network 122.

The application server 124 is a computing device or system coupled to the wireless network 122 that makes software applications 128 available for download by the mobile devices. Generally stated, the applications 128 are downloadable by the devices connected to the wireless network 122, such as the cellular phone 112, for execution on those devices. In this particular implementation, at least one of the applications 128 served by the application download server 124 is a content-based application configured for execution on at least one of the mobile devices. The content-based application (the client) is configured to retrieve content from the content server (not shown) for presentation by the mobile device via a user interface.

Figure 2:
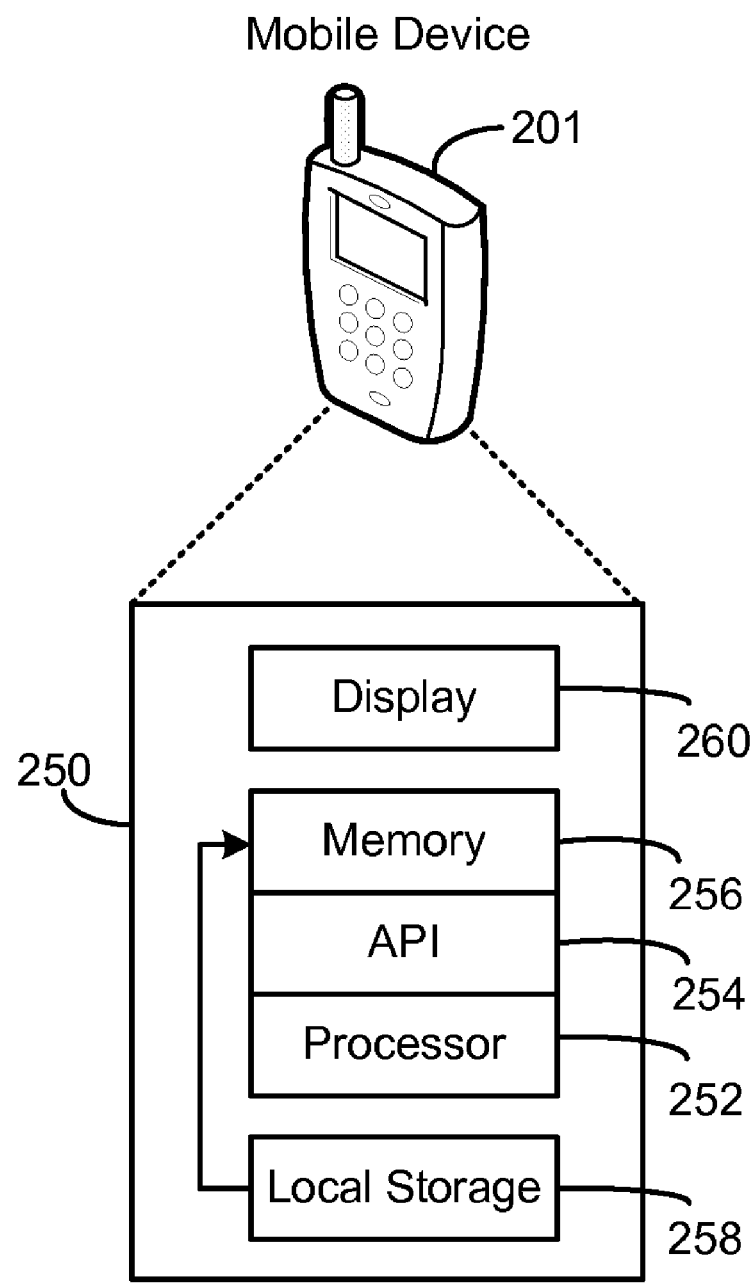
FIG. 2 is a functional block diagram generally illustrating the components of a sample mobile device in an embodiment of the present invention.

FIG. 2 is a functional block diagram generally illustrating the components of a sample mobile device 201, in an embodiment of the present invention. The mobile device 201 could be any device having computing functionality, such as a cellular telephone, a personal digital assistant, a handheld "palmtop" device, a laptop computer, a portable music player, a global positioning satellite (GPS) device, or the like.

The mobile device 201 has a computer platform 250 that can receive and execute software applications and display data. The computer platform 250 includes a processor 252, such as an application-specific integrated circuit "ASIC", digital signal processor ("DSP"), microprocessor, microcontroller, logic circuit, state machine, or other data processing device. The processor 252 executes the application programming interface ("API") layer 254 that interfaces with any resident programs in the memory 256 of the mobile device. The memory 256 can include random-access or read-only memory (RAM or ROM), EPROM, EEPROM, flash memory, or any memory common to computer platforms. The computer platform 250 also includes a local storage 258 that can hold software applications, files, or data not actively used in memory 256, such as software applications or user interface components downloaded from the user interface server 126 (FIG. 1). The local storage 258 is typically comprised of one or more flash memory cells, but can be any secondary or tertiary storage device as known in the art, such as magnetic media, EPROM, EEPROM, optical media, tape, or soft or hard disk.

The computer platform 250 also includes a display 260 that may be used by the software applications to display data using the user interface (not shown).

The components shown in FIG. 2 are typical of many types of mobile devices, but it will be appreciated that other components may be added to the mobile device 201 and in certain cases, some components shown in FIG. 2 may be omitted from the mobile device 201.

Figure 3:
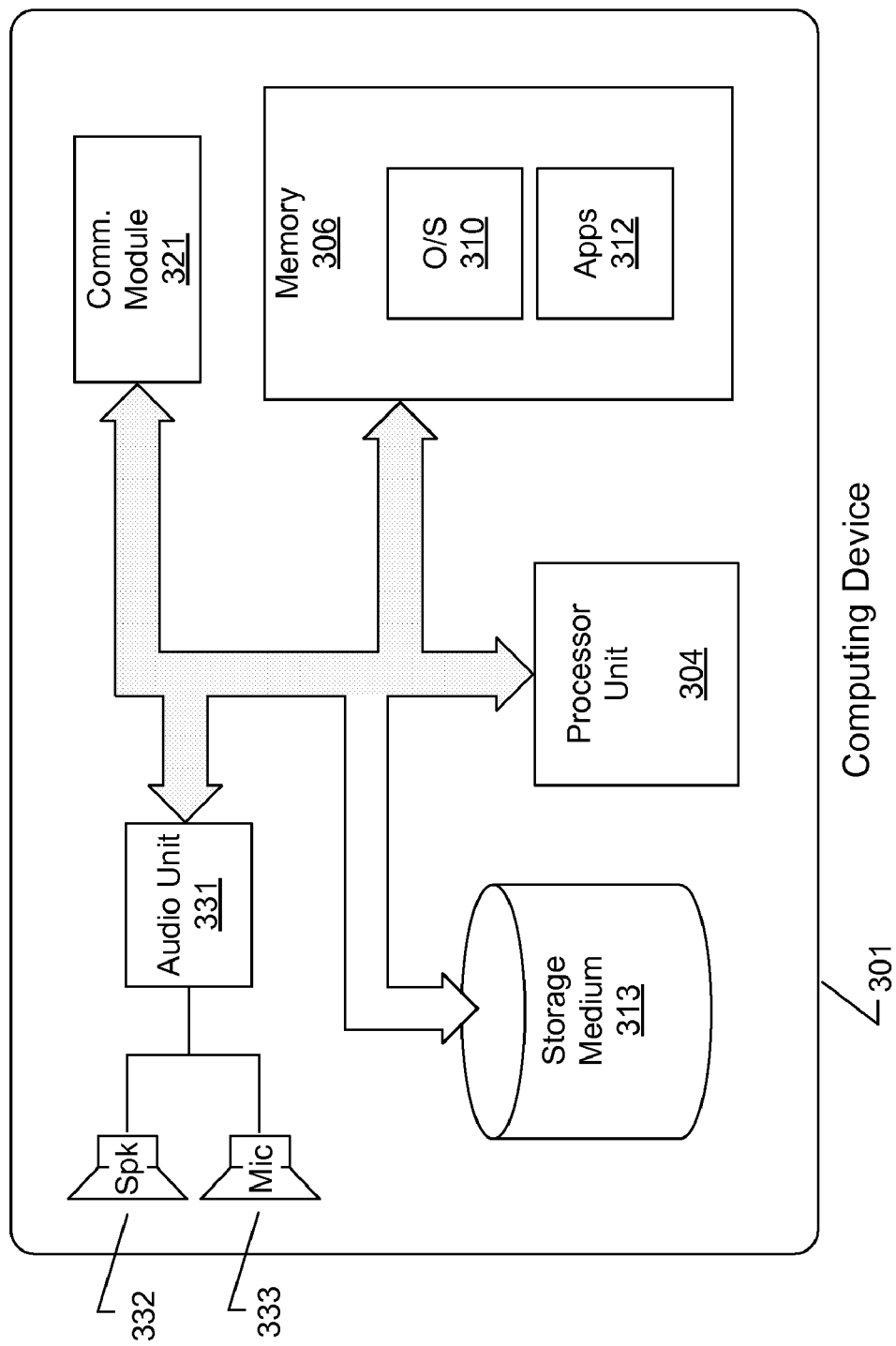
FIG. 3 is a functional block diagram generally illustrating the components of a sample computing device in an embodiment of the present invention.

FIG. 3 is a functional block diagram generally illustrating the core components of a sample computing device 301, in an embodiment of the present invention. The computing device 301 could be any fixed computing device, such as a desktop computer or server.

In this example, the computing device 301 includes a processor unit 304, a memory 306, a storage medium 313, and an audio unit 331. The processor unit 304 advantageously includes a microprocessor or a special-purpose processor such as a digital signal processor (DSP), but may in the alternative be any conventional form of processor, controller, microcontroller, or state machine. The processor unit 304 is coupled to the memory 306, which is advantageously implemented as RAM memory holding software instructions that are executed by the processor unit 304. In an alternate embodiment, the memory 306 could be composed of firmware or flash memory. In this embodiment, the software instructions stored in the memory 306 include an operating system 310 and one or more other applications 312, such as an application employing a user interface (not shown).

The mobile device 301 also includes a communications module 321 that enables bidirectional communication between the computing device 301 and one or more other computing devices, such as the mobile device. The communications module 321 may include components to enable RF or other wireless communications, such as a cellular telephone network, Bluetooth connection, wireless local area network, or perhaps a wireless wide area network. Alternatively, the communications module 321 may include components to enable land-line or hard-wired network communications, such as an Ethernet connection, RJ-11 connection, universal serial bus connection, IEEE 1394 (Firewire) connection, or the like. These are intended as non-exhaustive lists and many other alternatives are possible. The audio unit 331 is a component of the mobile device 301 that is configured to convert signals between analog and digital format. The audio unit 331 is used by the mobile device 301 to output sound using a speaker 332 and to receive input signals from a microphone 333.

FIG. 3 illustrates only certain components that are generally found in many conventional computing devices. Very many other components are also routinely found in particular implementations, and in certain cases, some components shown in FIG. 3 may be omitted. However, the computing device 301 shown in FIG. 3 is typical of the computing devices commonly found today.

Figure 4:
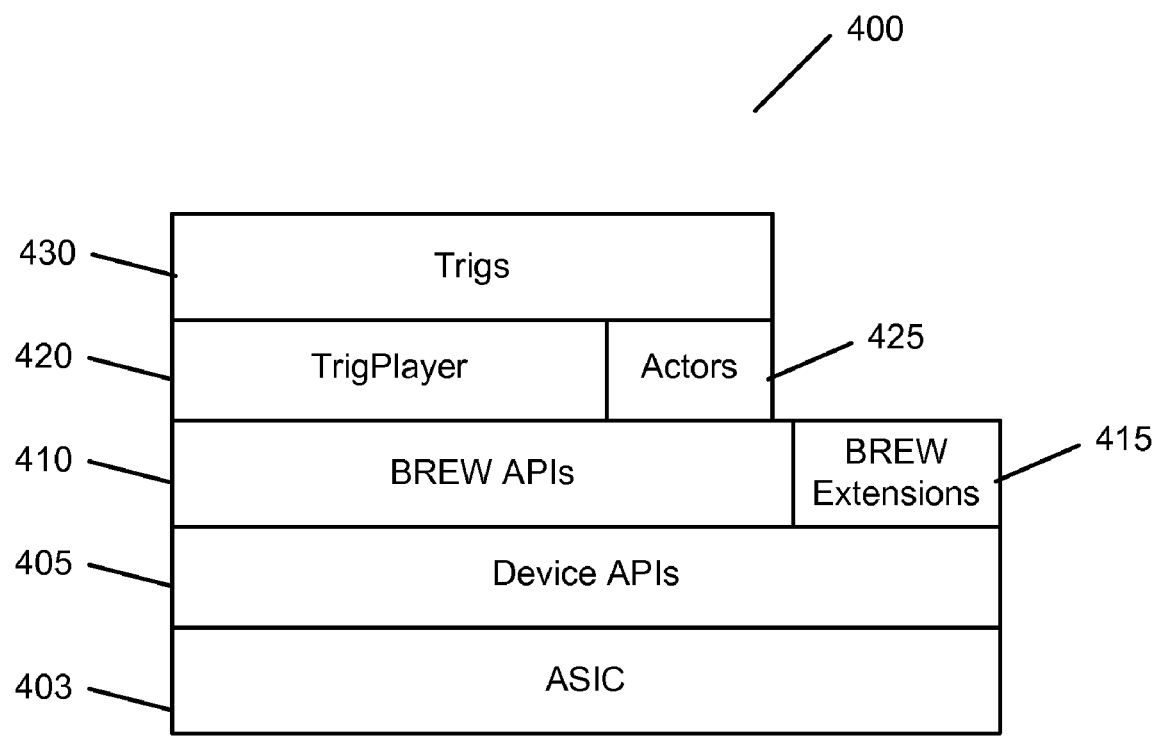
FIG. 4 is a block diagram illustrating an application architecture of a computer platform in an embodiment of the present invention.

FIG. 4 illustrates an application architecture of a device in an embodiment of the present invention. The device will include a "computer platform". A computer platform may refer to components of the device including of hardware, software or of both. For example, it may include the operating system, the underlying hardware components, including the chip, user interface hardware (e.g., displays, input and output devices), libraries, supporting APIs, additional extensions to the operating system, etc.

In one embodiment, the application architecture 400 of a wireless device includes Device APIs 405, BREW APIs 410, BREW Extensions 415, a Trigplayer 420, Actors 425, and Trigs 430. The Device APIs 405 may include those APIs used by a software platform to address functions associated specifically with that device, such as specific processor or ASIC functions, specific device hardware functionality, etc.

The BREW APIs 410 is a software platform developed by QUALCOMM Incorporated. The BREW APIs 410 provide the ability for applications to call Device APIs 405 and other functions without having to be written specifically for the device. In otherwords, it abstracts the specific aspects of the hardware from the application thereby allowing an application to be written for many devices without having to tailor, or requiring only slight tailoring, for each specific device on which the application executes.

A BREW extension 415 provides the ability to add additional capability to the BREW platform, such as offering MP3 players, Java Virtual Machines, etc.

A TrigPlayer 420, Trigs 430 and Actors 425 are components of the uiOne™ architecture developed by QUALCOMM Incorporated. These components typically refer to user interface aspects of the device 400. In one embodiment, the Trigs 430 are compiled TrigML® code, and other resources (which may include metadata, text files and images) used by an application to render a user interface on the device 400. Multiple Trigs 430 and updates to Trigs, referred to as Triglets (not shown) may be used for the user interface.

TrigML code, owned by QUALCOMM Incorporated, is a data language based on XML and may be used for user interface presentation language for authoring Trigs 430 and includes advantages of mobile-targeted functionality, an interactive user interface event model, and pixel positioning among other advantages.

Actors 425 include underlying C code to connect Trigs to underlying Device APIs 405 and/or BREW APIs 410. Actors 425 may also serve as executables for input/output. And because actors connect to the underlying Device and BREW APIs, they have access to the computer platform functions.

The Trigplayer 420 may be implemented as a BREW extension 415 even though it is separated out in FIG. 4. The Trigplayer is used to render the user interface using the Trigs and actors.

It will be recognized that although the discussion of FIG. 4 is in terms of the QUALCOMM Incorporated's uiOne architecture (including compiled TrigML, Trigplayer, BREW APIs, etc) that this is for descriptive purposes and that the present invention include other data languages, computer and software platforms and device architectures.

Figure 5:
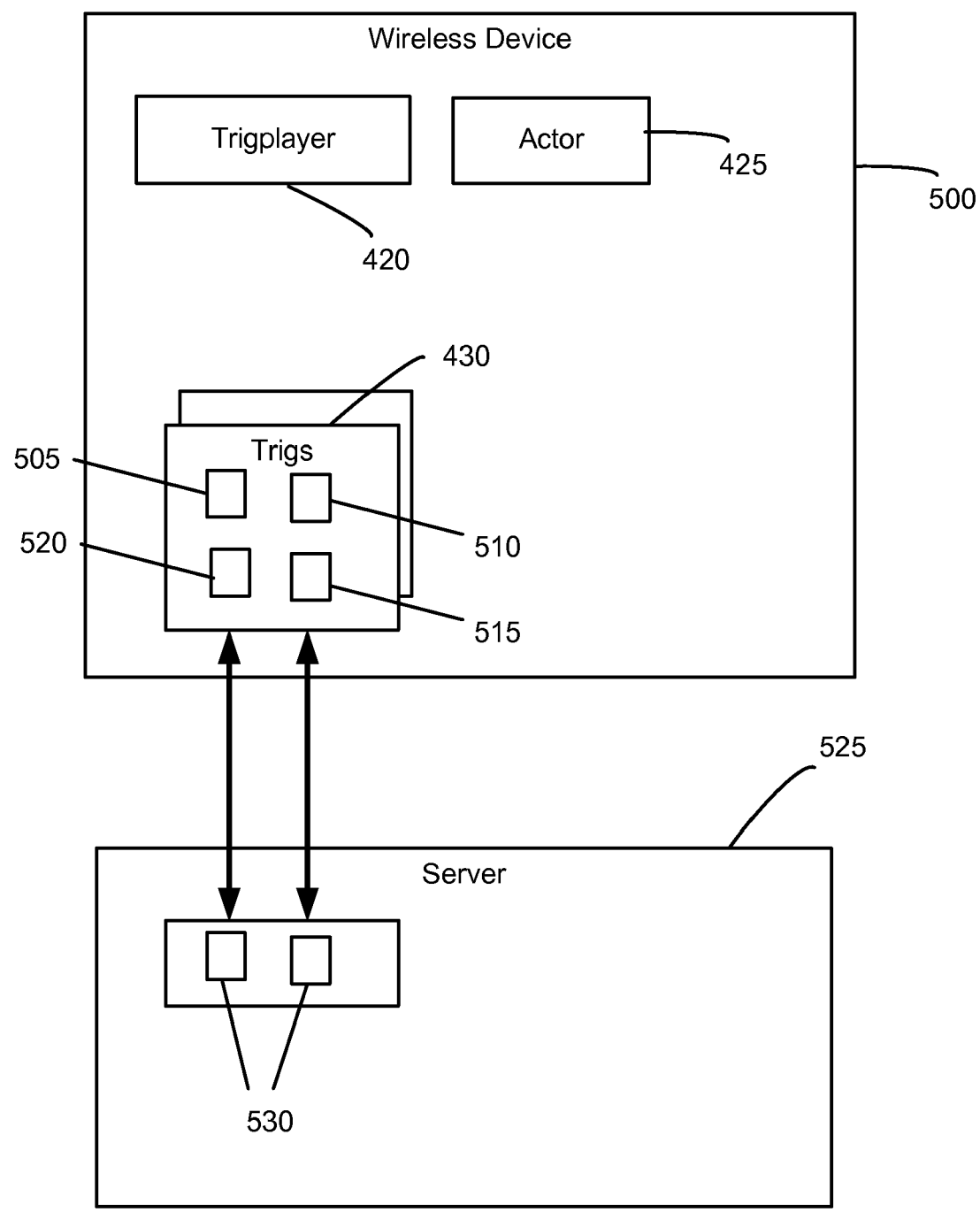
FIG. 5 is a block diagram illustrating the system of updating user interface components and an architecture depicting a trigplayer, actors and trigs in an embodiment of the present invention.

FIG. 5 is a block diagram illustrating the system of updating user interface components and an architecture depicting a trigplayer 420, actors 425 and trigs 430 in an embodiment of the present invention in an embodiment of the present invention. The device 500 includes a trigplayer 420, actors 425, and Trigs 430. The Trigs may include TrigML code 505, text strings 510, images 515 and update channels 520 (update channels may define URLs and timing schemes to fetch Triglets 530). Trigs may be updated over the air thereby allowing the user interface to be updated after the device has already left the manufacturer. A server 525 may be used to download new Trigs and or updated components of Trigs (e.g., Triglets 530) thus allowing the user interface for the device to be customized.

Addressing the more detailed aspects of the fine grain z-order control of user interface elements, in one embodiment, a rendering tree is normally done by a parent-first descent of the UI element tree. The UI element tree was created based on how the code elements associated with the UI element were declared in the Trig source file. A parent paints itself, and then asks each of its children in turn to paint themselves. Trig source file. It also clips each of its children to its own extent. With the introduction of a raise attribute, by which UI elements could delay their rendering until after the normal rendering pass—i.e., all non-raised UI elements would be rendered, then all raised UI elements. A UI element might be raised, for example, when that UI element had the control focus. (In one embodiment, "focus" refers to a part of the presentation in which attention is given, such as the highlighting or enlarging of the selection the cursor is one to indicate to the user which option would be selected if chosen). The raised UI element is not clipped by its parent's frame because it is outside of the normal cycle of rendering, so can render outside of its normal limits.

An example of program code using the rendering attribute, using TrigML:

```
<trigml>
  <group w="20" h="20">
    <group bgcolor="red" w=3-"h="30" raise="false">
      <att when="focus" name="raise" value = "true"/>
    </group>
    <group bgcolor="blue"/>
  </group>
</trigml>
```

Figure 6:
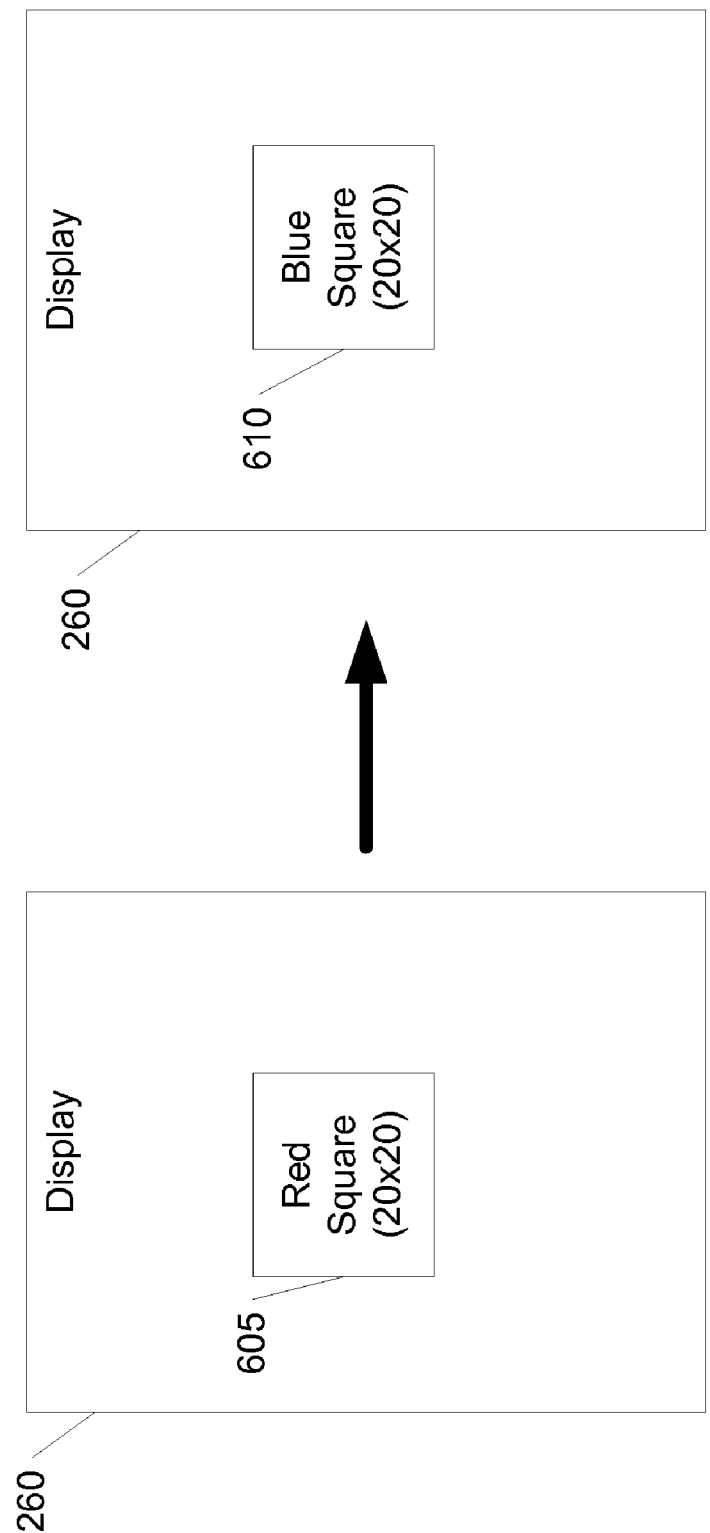
FIG. 6 is a block diagram illustrating the rendering of user interface elements without raising a user interface element in an embodiment of the present invention.

As shown in FIG. 6, when this TrigML program code fragment is rendered, the red group displays as a 20×20 red square 605 (it is clipped by its parent group, clipping not shown) on a display 260. The blue group is then rendered on top of it, so the final rendered page as seen by the user consists of just a blue 20×20 square 610.

Figure 7:
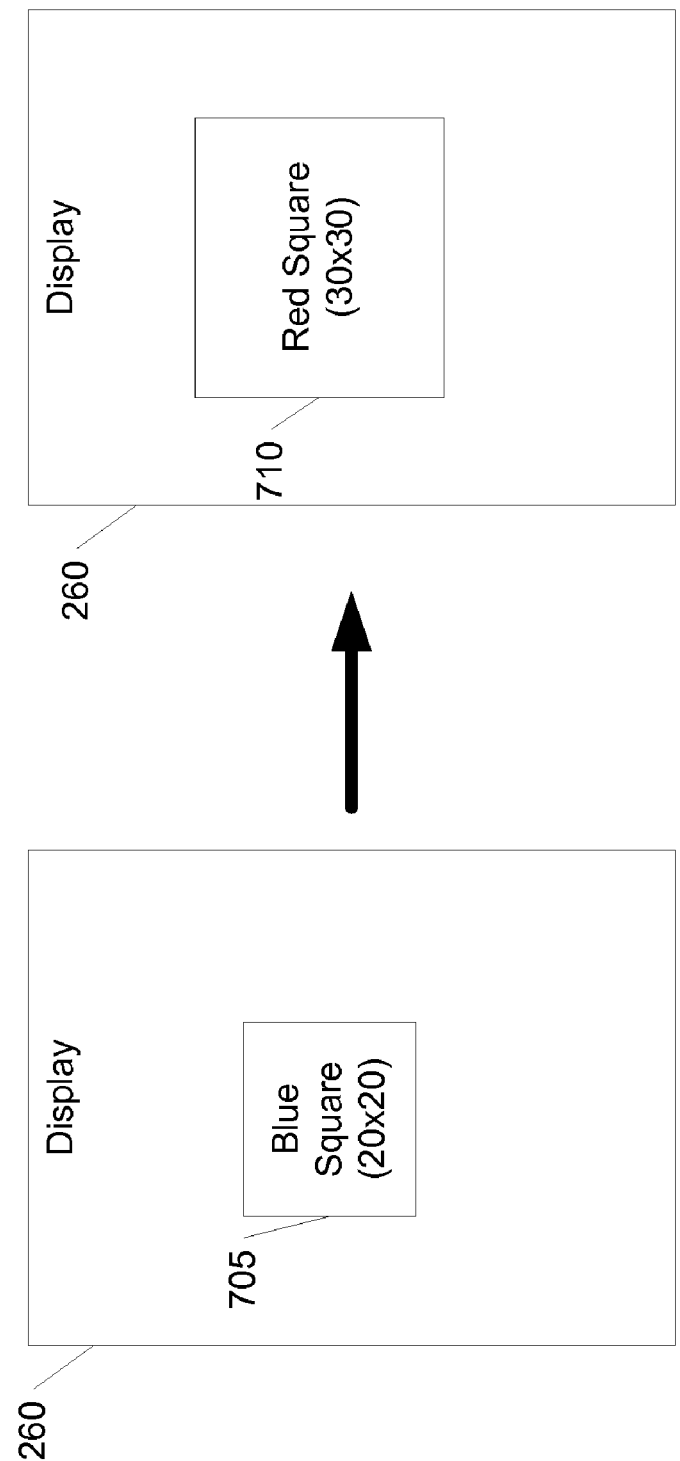
FIG. 7 is a block diagram illustrating the rendering of user interface elements using a raise user interface element in an embodiment of the present invention.

As shown in FIG. 7, if focus is then moved to the red group the <att> code element modifies the raise property of the red group, setting the value to true. When the page is rendered, the red group is skipped (because it is raised) and then the blue group is drawn as a 20×20 blue square 705. Finally the raised red group is rendered (unclipped, because it is raised) and the final rendered page as seen by the user consists of a 30×30 red square 710.

One embodiment relies on the implicit existence of a global deferred paint list and any UI element that defers rendering is added to this global list. This is an improvement over the prior art solutions.

Another embodiment does not raise UI elements to a global level, such that they are painted after all non-raised UI elements. The addition of a <raisecontainer> element "catches" the raised UI element. This may allow, for example a UI element to be raised, but other (non-raised) UI elements to continue to be rendered after it, allowing a permanent top-level activity. An example of this, using TrigML program code, is illustrated by the following:

```
<trigml>
  <group w="20" h="20" bgcolor="red" raise ="false">
    <att when="focus" name="raise" value="highplace"/>
  </group>
  <group w="20" h="20 bgcolor="blue">
    <raisecounter id="highplace"/>
    <group bgcolor="green" w="10" h="10"/>
  </group>
</trigml>
```

A tree is created as described above using the order of the UI elements in which they were declared. The normal rendering order here is red, blue, green and the user sees a 10×10 green square overlaid on a 20×20 blue square. In the normal rendering, raisecontainer is empty so nothing is rendered when it is evaluated.

However, when the red group is raised, the z-order is changed such that the red group is painted by using the raisecounter as shown above. The rendering is therefore blue, red, green, resulting in a 10×10 green square overlaid on a 20×20 red square. This has the advantage that we have achieved a raise of a UI element but also have managed to keep the overlaid green square. This extra control over the level to which we raise a UI element provides a way to preserve an overlay. A typical use-case is a pop-up menu, which should be drawn on top of everything else, including any currently in-focus UI elements that have raised themselves.

Raisecontainers may be nested, and the raisecontainer itself may be raised, giving far more control over layers and sublayers of the UI than was previously possible. In effect a raisecontainer is a layer, but the layer can change its z-order and need not be full screen. Thus achieving fine grain control over the z-order, i.e., controlling the z-order within layers versus just pushing a UI element all the way to the top or all the way to the bottom of the layers.

In addition, a raised UI element has been painted by the raisecontainer, and is therefore clipped by the raisecontainer's frame, meaning that modifying a raised UI element need no longer trigger a refresh of the entire screen. This allows more complex UIs to be implemented without requiring increased processing power.

Figure 8:
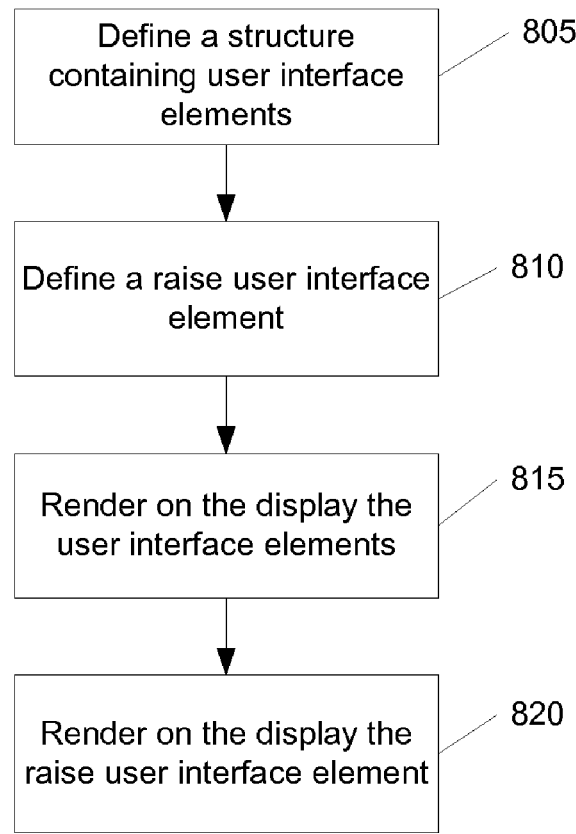
FIG. 8 is a flowchart depicting the process of rendering a raise element in an embodiment of the present invention.

FIG. 8 is a flowchart depicting the process of rendering a raise element in an embodiment of the present invention. Initially, a structure is defined containing the user interface elements (Step 805). This structure may be a tree structure as defined above or another file or data structures that can track the user interface elements to render. Next a raise user interface element is defined (Step 810). The raise user interface element is an element that will want to be rendered after other elements. The raise element may typically be defined to be rendered in a order defined by the structure with respect to Step 805, however, it is desired to render this raise element outside of the normal order.

The user interface elements are then rendered on the display (Step 815). This rendering is done by stepping through the structure defined in step 805. Note that the rendering may not just be for a presentation, but may be program code that defines behavior. It is preferable to not render the raise user interface element at this step because it will be rendered again (defined below in Step 820), thus preventing the rendering of the raise user interface element twice.

And finally the raise user interface element is displayed (Step 820). Although the description defines just one raise user interface element, multiple user interface elements may be defined to be "raised" and thus multiple user interface elements may be rendered out of the normal user interface element structure order.

The above method and software design description may also be implemented in an apparatus, stored as instructions in RAM or in other memory storage devices.

The above method and software design description may also be implemented in an apparatus, stored as instructions in RAM or in other memory storage devices. Although the processes presented in this document have been illustrated and described sequentially in a particular order, in other embodiments, the steps of the processes may be performed in different orders, multiple times, and/or in parallel. Further, in some embodiments, one or more steps described in the several processes may be performed as separate steps, combined into fewer steps, or possibly omitted entirely.

While the foregoing disclosure shows illustrative embodiments of the invention, it should be noted that various changes and modifications could be made to the described embodiments without departing from the spirit and scope of the invention as defined by the appended claims. Furthermore, although elements of the invention may be described or claimed in the singular, the plural is contemplated unless limitation to the singular is explicitly stated.

What is claimed is:

1. A method of rendering user interface elements of a presentation, the method comprising:
   receiving a plurality of user interface elements having a predetermined z-order, wherein the plurality of user interface elements comprises a first raised user interface element and a plurality of non-raised user interface elements;
   rendering each of the plurality of non-raised user interface elements at a display according to the predetermined z-order while skipping the first raised user interface element;
   rendering the first raised user interface element, after the non-raised user interface elements; and
   wherein the first raised user interface element is assigned to a first raisedcontainer element, a second raised user interface element is assigned to a second raisedcontainer element, and wherein either the first raisedcontainer element or the second raisedcontainer element is a raised, raisedcontainer element.

2. The method of claim 1, the method further comprises:
   rendering the first raised user interface element and the second raised user interface element according to the predetermined z-order, after the non-raised user interface elements.

3. The method of claim 2, further comprising:
   rendering a user interface element within a raisedcontainer element; and
   rendering another user interface element within a raised, raisedcontainer element after the user interface element within the raisedcontainer.

4. The method of claim 1, further comprising:
   receiving a modification to the first raised user interface element; and
   refreshing the first raised user interface element without refreshing the non-raised user interface elements.

5. A mobile device, comprising:
   means for receiving a plurality of user interface elements having a predetermined z-order, wherein the plurality of user interface elements comprises a first raised user interface element and a plurality of non-raised user interface elements;
   means for rendering each of the plurality of non-raised user interface elements at a display according to the predetermined z-order while skipping the first raised user interface element; and
   means for rendering the first raised user interface element, after the non-raised user interface elements; and
   wherein the first raised user interlace element is assigned to a first raisedcontainer element, a second raised user interface element is assigned to a second raisedcontainer element, and wherein either the first raisedcontainer element or the second raisedcontainer element is a raised, raisedcontainer element.

6. The device of claim 5, the device further comprises:
   means for rendering the first raised user interface element and the second raised user interface element according to the predetermined z-order, after the non-raised user interface elements.

7. The device of claim 6, further comprising:
   rendering a user interface element within a raisedcontainer element; and
   rendering another user interface element within a raised, raisedcontainer element after the user interface element within the raisedcontainer.

8. The device of claim 5, further comprising:
   means for receiving a modification to the first raised user interface element; and
   means for refreshing the first raised user interface element without refreshing the non-raised user interface elements.

9. A mobile device, comprising:
   a memory;
   a display; and
   a processor, wherein the processor is operable to:
      receive from the memory a plurality of user interface elements having a predetermined z-order, wherein the plurality of user interface elements comprises a first raised user interface element and a plurality of non-raised user interface elements;
      render at the display each of the plurality of non-raised user interface elements at a display according to the predetermined z-order while skipping the first raised user interface element;
      render at the display the first raised user interface element, after the non-raised user interface elements; and
      wherein the first raised user interface element is assigned to a first raisedcontainer element, a second raised user interface element is assigned to a second raisedcontainer element, and wherein either the first raisedcontainer element or the second raisedcontainer element is a raised, raisedcontainer element.

10. The device of claim 9, the processor is further operable to:
    render at the display the first raised user interface element and the second raised user interface element according to the predetermined z-order, after the non-raised user interface elements.

11. The device of claim 10, wherein the processor is further operable to: render at the display a user interface element within a raisedcontainer element; and render at the display another user interface element within a raised, raisedcontainer element after the user interface element within the raisedcontainer.

12. The device of claim 9, wherein the processor is further operable to:
    receive from the memory a modification to the first raised user interface element; and
    refresh at the display the first raised user interface element without refreshing the non-raised user interface elements at the display.

13. A computer program product, comprising:
    a computer-readable storage medium, comprising:
    at least one instruction for receiving a plurality of user interface elements having a predetermined z-order, wherein the plurality of user interface elements comprises a first raised user interface element and a plurality of non-raised user interface elements;
    at least one instruction for rendering each of the plurality of non-raised user interface elements at a display according to the predetermined z-order while skipping the first raised user interface element;

at least one instruction for rendering the first raised user interface element, after the non-raised user interface elements; and wherein the first raised user interface element is assigned to a first raisedcontainer element, a second raised user interface element is assigned to a second raisedcontainer element, and wherein either the first raisedcontainer element or the second raisedcontainer element is a raised, raisedcontainer element.

14. The computer program product of claim 13, the computer-readable storage medium further comprises:

at least one instruction for rendering the first raised user interface element and the second raised user interface element according to the predetermined z-order, after the non-raised user interface elements.

15. The computer program product of claim 14, wherein the computer-readable storage medium further comprises:

at least one instruction for rendering a user interface element within a raisedcontainer element;

and at least one instruction tbr rendering another user interface element within a raised, raisedcontainer element after the user interface element within the raisedcontainer.

16. The computer program product of claim 13, wherein the computer-readable storage medium further comprises:

at least one instruction for receiving a modification to the first raised user interface element; and at least one instruction for refreshing the first raised user interface element without refreshing the non-raised user interface elements.

* * * * *